Patented Dec. 19, 1950

2,534,781

UNITED STATES PATENT OFFICE 2,534,781

STABLE LITHIUM HYPOCHLORITE COMPOSITION

James Douglas MacMahon, Niagara Falls, N. Y., assignor to Mathieson Chemical Corporation, a corporation of Virginia No Drawing. Application May 24, 1945, Serial No. 595,662

3 Claims. (Cl. 252—99)

This invention relates to a new hypochlorite composition in solid form comprising lithium hypochlorite as its hypochlorite component. The composition is particularly valuable for use in cleansing, disinfecting, and similar operations.

Dissolved in water the composition of the invention gives solutions of high disinfecting efficiency which may be employed, for example, in the disinfection of pipe lines, pasteurizers, coolers, and containers in milk and other food processing plants and of kitchen utensils, dishes, glassware, etc. in food and drink dispensing establishments.

A particularly important characteristic of my lithium hypochlorite-containing composition is its stability. Unlike most hypochlorite preparations heretofore employed, it may be stored over a period of months with only slight loss of its available chlorine content. My composition differs from similar compositions containing calcium hypochlorite in that it permits the preparation of aqueous cleansing and disinfecting solutions that are either clear or free from excessive turbidity.

In addition to lithium hypochlorite, my composition comprises, as an essential ingredient, a water soluble alkali metal carbonate, a water soluble alkali metal normal monophosphate, a water soluble alkali metal silicate, or any suitable combination of two or more of such alkaline salts. Inert salts such as sodium chloride and potassium chloride may be present in the composition as may be compounds which prevent precipitation of alkaline earth metal salts when the composition is added to hard water. My composition may further contain a wetting agent in order to enhance its bactericidal action. Where a wetting agent is included, it may be advisable to add a desiccant, such as sodium monoxide, which is compatible with the other components, particularly where large proportions of the wetting agent are used. It may also be desirable to employ a suitable desiccant where the water content of the lithium hypochlorite or of the alkaline material would otherwise tend to adversely affect the stability of the composition.

Alkali metal carbonates suitable for use in my composition include sodium carbonate, potassium carbonate and such of the other alkali metal carbonates as are sufficiently water-soluble. Tribasic sodium and potassium phosphates are exemplary of alkali metal monophosphates suitable for employment herein. Sodium and potassium metasilicates represent examples of suitable alkali metal silicates. Since lithium carbonate, tribasic lithium phosphate, and lithium metasilicate are essentially water insoluble, these compounds are unadapted for use according to the invention. One advantage of employing a silicate in the composition resides in the fact that the silicate opperates to prevent discoloration of aluminum articles or equipment upon contact with solutions of the composition and also serves to prevent loss of aluminum.

In the preparation of the composition, it is permissible to use a mixture of carbonate and bicarbonate, for example, a mixture of sodium carbonate and sodium bicarbonate, in lieu of pure carbonate or a mixture of normal monophosphate and acid phosphate, for example, a mixture of tri- and di-sodium phosphate, in lieu of pure normal monophosphate. To avoid the possibility of an excessive rate of decomposition under conditions of commercial use, I prefer to limit the proportion of acid salt to an amount not substantially exceeding that of the normal salt. I have found that mixtures containing sodium bicarbonate or di-sodium phosphate alone are extremely unstable.

The proportion of alkaline material in the composition may vary within wide limits, being determined primarily by the avialable chlorine content desired. Ordinarily I employ from about 3 to 10 parts of alkaline material per part of hypochlorite. By the term "alkaline material," I refer to the acid salt-containing mixtures above mentioned, as well as to the individual carbonates, normal monophosphates, and silicates, and their admixtures.

Since my experimental work indicates that the stability of my composition is chiefly a function of the water content of the lithium hypochlorite employed, I use a lithium hypochlorite which is substantially anhydrous, i. e., a lithium hypochlorite product having a water content of not more than about 6% of the anhydrous lithium hypochlorite content of the lithium hypochlorite product. It is a further preference that the lithium hypochlorite product contain approximately 100% of available chlorine.

Where prolonged periods of storage under abnormally high storage temperatures are anticipated, it may be advisable to use a lithium hypochlorite which has a water content of not more than about 3% of the anhydrous lithium hypochlorite content. I have found that mixtures containing lithium hypochlorite monohydrate lose at least 80% of the available chlorine content when stored in tightly stoppered bottles for 50 days at a temperature of about 30° C.

In the preferred practice of the invention, I use lithium hypochlorite prepared by the method of Edward C. Soule described in his application, Serial No. 475,175, filed February 8, 1943, now abandoned. According to this method, substantially anhydrous lithium hypochlorite is produced by drying lithium hypochlorite monohydrate at a temperature within the range of from about 20° C. to 60° C. and at a pressure less than about 1/10 of the vapor pressure of water for any particular temperature used.

Lithium hypochlorite monohydrate for drying as above may be prepared in the conventional manner by chlorinating lithium hydroxide solutions and separating the monohydrate from the solution by evaporation of the water. However, this method results in the formation of a substantial proportion of lithium chloride which is difficult to separate from the hypochlorite. Accordingly it is more desirable to produce the lithium hypochlorite monohydrate as by the method disclosed in United States Patents Nos. 1,481,039, and 1,481,040 which yields a lithium hypochlorite substantially free from lithium chloride. Thus, the monohydrate may be prepared by chlorinating a lithium hydroxide solution or slurry to form a mixture of lithium chloride and lithium hypochlorite, separating the lithium hypochlorite from the lithium chloride by treatment with an alcohol to form the corresponding alkyl hypochlorite, which is readily separable from the lithium chloride, and subsequently treating the separated alkyl hypochlorite with lithium hydroxide whereby the alkyl hypochlorite is converted to lithium hypochlorite which is separated by evaporation of the solution as lithium hypochlorite monohydrate substantially free from lithium chloride.

As a further alternative, the lithium hypochlorite monohydrate may be prepared substantially free from lithium chloride but containing sodium or potassium chloride by reacting lithium chloride with a hypochlorite of sodium or potassium, as more fully described in application Serial No. 479,778, filed March 19, 1943, now abandoned, by Edward C. Soule. As previously indicated herein, the presence of sodium or potassium chloride in the composition of the invention is not objectionable. As a still further alternative, the lithium hypochlorite monohydrate may be produced by reacting an alkaline earth metal hypochlorite with lithium carbonate as described in co-pending application Serial No. 479,779, filed March 19, 1943, also by Edward C. Soule, now abandoned.

Although tri-sodium phosphate monohydrate may be used in the composition of the invention with good effect, I prefer that the alkaline component be substantially anhydrous. I have found that the use of the monohydrate of sodium carbonate results in a product which is substantially less stable than a product prepared with anhydrous sodium carbonate.

Where my composition is to be dissolved in hard water, I customarily include a polyphosphate as a component of the composition in order to check any tendency toward turbidity. Exemplary of suitable polyphosphates may be mentioned: sodium pyrophosphate, sodium tetraphosphate, sodium hexametaphosphate, sodium tripolyphosphate and the like. Substantially larger amounts of polyphosphate than about 5% on the alkaline component are usually unnecessary in order to prevent the precipitation of insoluble calcium or magnesium salts when the composition is dissolved in hard water. In general, the amount of polyphosphate included in the composition depends on the degree of hardness of the water to which the composition is to be added.

Suitable wetting agents for inclusion in the composition of the invention are those stable in the presence of the alkaline component and lithium hypochlorite. As examples, may be mentioned: "Nacconal," or sodium decylbenzene sulfonate, "Nekal BX," or sodium isobutylnaphthalene sulfonate, "Santomerse," another alkylated benzene sulfonate, "Orvus," or sodium lauryl sulfate, and "Ultravon KW," a sulfonated or sulfated stearyl compound.

In the preparation of the composition of the invention, any suitable device such as an ordinary mixing drum adapted for the intimate admixing of solid particles may be employed. For best results, the components should have a uniform particle sizing.

The following examples are submitted in illustration of the stability of my composition. In each case, the lithium hypochlorite used had an available chlorine content of approximately 100% and a water content of about 2%. All samples were stored in stoppered amberglass bottles.

*Example I*

Lithium hypochlorite and anhydrous sodium carbonate were intimately admixed in a weight ratio of about 1:8. The resulting mixture, containing 10.77% available chlorine, was stored at a temperature of about 30° C. for a period of 141 days. Upon analysis at the end of the storage period, the mixture showed an available chlorine content of 10.73%.

*Example II*

A composition containing about 10% lithium hypochlorite, 87% anhydrous sodium carbonate, and 3% $Na_4P_2O_7$, and having an available chlorine content of 10.41%, was stored at a temperature of about 30° C. for 97 days. At the end of the storage period, the available chlorine content was 10.40%.

Sodium tripolyphosphate, $Na_5P_3O_{10}$, for example, may be substituted for the sodium pyrophosphate.

*Example III*

A composition containing about 20% lithium hypochlorite, 77% anhydrous sodium carbonate, and 3% sodium pyrophosphate, and having an available chlorine content of 20.02%, was stored at a temperature of about 30° C. for 97 days. At the end of the storage period, the available chlorine content was 20.00%.

*Example IV*

A composition containing about 11.5% lithium hypochlorite and 88.5% trisodium phosphate monohydrate, and having an available chlorine content of 10.81%, was stored at a temperature of about 30° C. for 103 days. At the end of the storage period, the available chlorine content was 10.46%.

*Example V*

A composition containing about 10% lithium hypochlorite, 44% trisodium phosphate monohydrate, 43% anhydrous disodium phosphate, and 3% sodium pyrophosphate, and having an available chlorine content of 10.00%, was stored at a temperature of about 30° C. for 97 days. At the end of the storage period, the available chlorine content was 9.99%.

Example VI

A composition containing about 10.3% lithium hypochlorite, 79.7% sodium carbonate anhydrous, and 10% Orvus, and having an available chlorine content of 10.35%, was stored at a temperature of about 30° C. for 113 days. At the end of the storage period, the available chlorine content was 10.32%.

Example VII

A composition containing about 10.3% lithium hypochlorite, 75.7% anhydrous sodium carbonate, 10% Orvus, and 4% sodium monoxide, and having an available chlorine content of 10.10%, was stored at a temperature of about 30° C. for 113 days. At the end of the storage period, the available chlorine content was 10.09%.

Example VIII

A composition containing about 10% lithium hypochlorite, 78% anhydrous sodium carbonate, 3% sodium pyrophosphate, 5% Nacconal, and 4% sodium monoxide, and having an available chlorine content of 10.35%, was stored at a temperature of about 30° C. for 113 days. At the end of the storage period, the available chlorine content was 10.32%.

Example IX

A composition containing 12.3% lithium hypochlorite, 30.7% anhydrous sodium carbonate, 18% anhydrous sodium bicarbonate, 35% Orvus, and 4% sodium monoxide, and having an available chlorine content of 11.08%, was stored at a temperature of about 30° C. for 113 days. At the end of the storage period, the available chlorine content was 10.80%.

This mixture is particularly valuable for use in rug cleaning.

Example X

A composition containing about 10% lithium hypochlorite, 33% anhydrous sodium carbonate, 15% anhydrous sodium bicarbonate, 3% sodium pyrophosphate, 35% Nacconal, and 4% sodium monoxide, and having an available chlorine content of 10.25%, was stored at a temperature of about 30° C. for 97 days. At the end of the storage period, the available chlorine content was 10.13%.

Example XI

A composition containing 10% lithium hypochlorite, 65% anhydrous sodium carbonate and 25% anhydrous sodium metasilicate and having an available chlorine content of 10.32%, after storage for a period of 100 days will still show an available chlorine content of not substantially less than 9.95%. Trisodium phosphate, for example, may be substituted for the sodium carbonate.

Example XII

A composition containing about 10% lithium hypochlorite and 90% anhydrous metasilicate having an available chlorine content of 10.07% was stored in glass at a temperature of about 30° C. for 100 days. At the end of the storage period the available chlorine content was 9.33%.

In the case of each of the examples, a clear solution resulted upon dissolving a sufficient amount of the composition in distilled water to give a solution containing 500 parts per million of available chlorine.

Anyone familiar with the art will recognize that my composition possesses excellent stability and that it easily complies with the commercial definition of that term as applying to hypochlorite compositions heretofore employed. Many of the products containing hypochlorite now commercially acceptable have been found to lose as high as 25% of their available chlorine content when stored for a period of three months at this temperature. I have also found that some of them, for example, sodium hypochlorite solutions containing upwards of 10% available chlorine, will decompose at an even higher rate under similar temperature conditions.

I claim:

1. A stable solid water soluble composition adapted for use in cleansing, disinfecting and similar operations consisting essentially of substantially anhydrous lithium hypochlorite and at least one substantially anhydrous alkali metal component selected from the group consisting of sodium carbonate, trisodium phosphate and sodium silicate in a proportion within the approximate range of 3 to 10 parts for each part of lithium hypochlorite.

2. The composition of claim 1 which also contains up to about 5 per cent by weight of a water soluble sodium polyphosphate.

3. The composition of claim 2 which also contains an alkali stable compatible wetting agent and about 4 per cent sodium monoxide.

JAMES DOUGLAS MacMAHON.

REFERENCES CITED

The following references are of record in the file of this patent:

UNITED STATES PATENTS

| Number | Name | Date |
|---|---|---|
| 1,628,015 | Welsher | May 10, 1927 |
| 2,020,228 | Ashton | Nov. 5, 1935 |
| 2,092,913 | Fiske | Sept. 14, 1937 |
| 2,356,820 | Cady | Aug. 29, 1944 |
| 2,415,657 | Riggs et al. | Feb. 11, 1947 |
| 2,435,474 | Soule | Feb. 3, 1948 |

FOREIGN PATENTS

| Number | Country | Date |
|---|---|---|
| 20,884 | Great Britain | of 1901 |